May 22, 1923.                                           1,456,003
D. GUELBAUM
GRAIN CUTTING MACHINE WITH AUTOMATIC SCOOPS
Filed Jan. 24, 1923
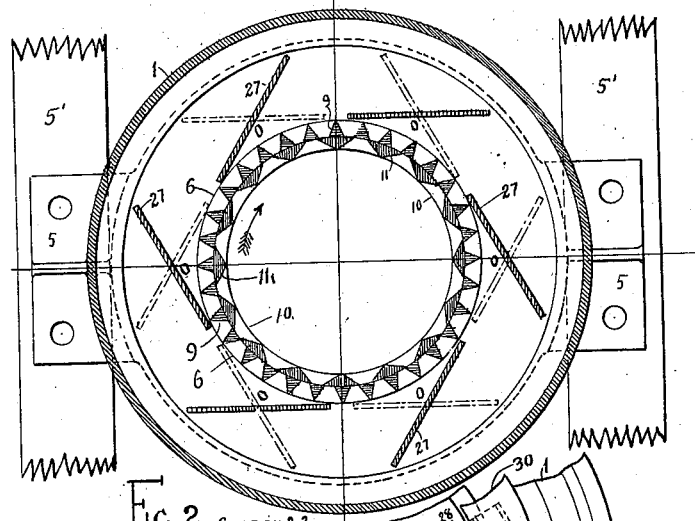
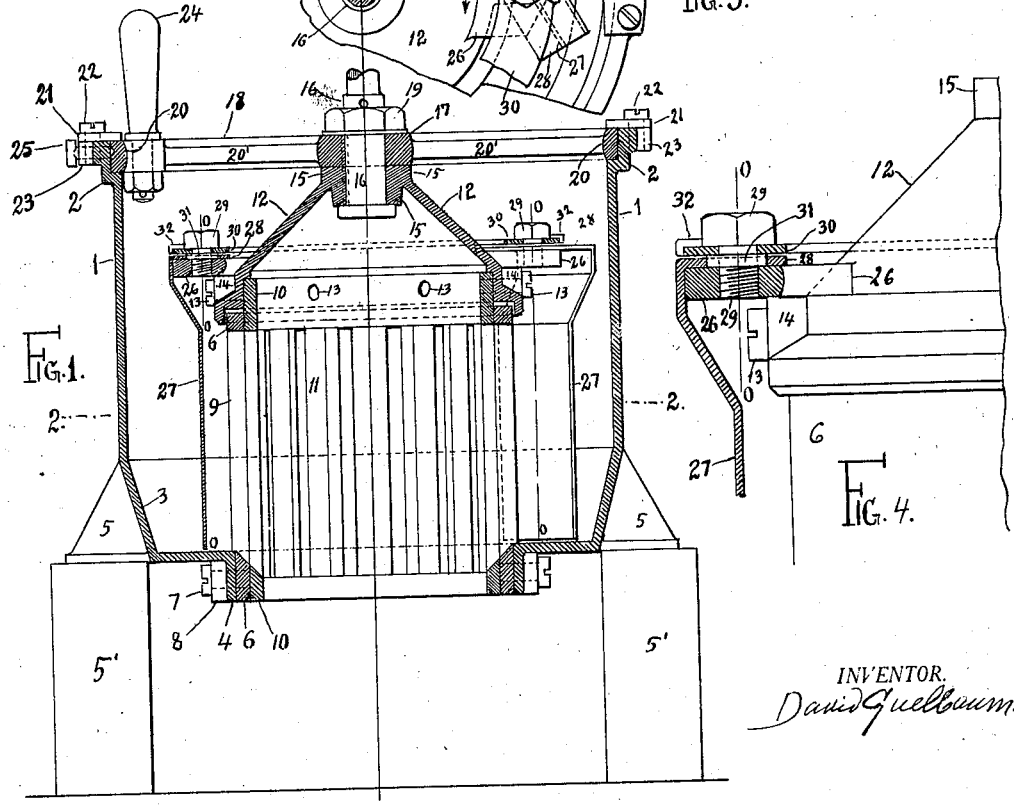
INVENTOR.
David Guelbaum.

Patented May 22, 1923.                                                    1,456,003

UNITED STATES PATENT OFFICE.

DAVID GUELBAUM, OF SYRACUSE, NEW YORK.

GRAIN-CUTTING MACHINE WITH AUTOMATIC SCOOPS.

Application filed January 24, 1923. Serial No. 614,589.

*To all whom it may concern:*

Be it known that I, DAVID GUELBAUM, a citizen of the United States, and a resident of Syracuse, in the county of Onondaga and State of New York, have invented a certain new and useful Grain-Cutting Machine with Automatic Scoops, of which the following is a specification.

My invention of a grain cutting machine with automatic scoops has for its object the cutting up of cereal grains, such as wheat, rye, barley, into particles, coarse or fine, without cracking or crashing of the grains and without powdered wastage, by means of rotary knives and scoops automatically adjusting themselves to the direction of rotation of said knives, so that said knives may be worked in either direction or reciprocally. And reference is here made to the applicant's previous application for a "Grain cutting machine," filed Oct. 21, 1922, Ser. No. 596,176.

My invention comprises the above novel features, embodied in combinations and constructions as hereinafter set forth and claimed, and as illustrated in the accompanying drawings, in which similar characters designate the same corresponding parts in all the views.

Fig. 1 is a vertical section of my grain cutting machine.

Fig. 2 is a cross section of same, showing the cutting edges and scoops.

Fig. 3 is a fractional top view, showing scoop and pivot.

Fig. 4 is a magnified section of scoop and pivot.

As seen on Fig. 1, my grain cutting machine consists of the grain hopper 1 having an offset cylindrical flanged top 2 and a slightly tapered bottom 3 with an open neck 4 in the centre and provided with the supporting brackets 5.

Into said neck 4 and resting on same is fitted the stationary outer cylinder 6 held securely by the screws 7 passing through the cast on bosses 8. This cylinder is provided with longitudinal slots separated by the triangular strips 9, as shown in elevation and cross section on Figs. 1 and 2.

Inside this stationary outer cylinder 6 is fitted slidingly the inner rotary cutting cylinder 10 provided with similar longitudinal slots with sharp beveled cutting edges 11, as shown on Figs. 1 and 2. The top of this inner cutting cylinder 10 fits into the bottom of the cone shaped cover 12 held securely by the screws 13 passing through the cast on bosses 14, as shown on Figs. 1 and 4.

This cover 12 terminates at its top with the hub 15 into which is key-seated the bolt or gudgeon 16 fastened likewise to the hub 17 of the hand wheel 18, both said hubs 15 and 17 being securely held together by the nut 19.

The rim 20 of said hand wheel is connected to its hub by the several arms 20' and rests on the offset top flange 2 of the hopper 1 fitting slidingly into same, as shown on Fig. 1. The rim 20 is held fast to its seat by the clips 21 with the screws 22 screwed into the lugs 23 cast on the top flange of the hopper 1, as shown on Figs. 1 and 3.

Thus the hand wheel 18 carrying the cone shaped cover 12 with the cutting cylinder 10 is reliably supported and guided, taking off all side strains from the cutting cylinders. By unfastening the clips 21, the hand wheel 18 with the cover 12 and the inner cylinder 10 can bodily be taken out of the grain hopper.

To one of the arms 20' near the rim is fastened the handle 24 for rotating the hand wheel 18 together with the cover 12 and the inner cutting cylinder 10. For the same purpose the gudgeon 16 may be extended above the hand wheel and a pulley attached to it for a belt drive, if so desired, as indicated on Fig. 1, showing the gudgeon broken off on top.

The hand screw 25 passing through the lug 23 and piercing into the rim 20, shown on Fig. 1, is provided for holding the hand wheel 18 fixed, when the machine is not working, in such a position, that the strips of the inner cylinder 10 cover the slots of the outer cylinder 6, as shown on Fig. 2, and no grains can pass through the slots.

The cone shaped cover 12 is provided with the cast on lugs 26, shown on Figs. 1 and 3, and magnified on Fig. 4. On these lugs rest the flat tops 28 of the scoops 27, consisting of bent plates, as shown. Into the lugs 26 are screwed in the bolts or pivots 29 passing through the plate ring 30 held at a fixed distance from the lugs by the separator rings 31, around which the flat tops 28 of the scoops 27 can thus freely turn on their central axes without buckling. The plate ring 30 is provided with the projections 32 opposite the pivots 29; after the pivots are tightly screwed in, the projections 32 are bent up against the hexagon heads of the pivots, as an Figs. 4 and 3, so they cannot get loose.

The grain hopper 1 is shown on Figs. 1 and 2 as resting with its brackets 5 on wooden blocks or pedestals 5', to which they may be bolted on; between these blocks there is an open space for placing a receptacle to collect the grain cuttings.

The action of the machine is as follows: Filling the hopper with grain, loosening the hand screw 25 and rotating the hand wheel by the handle 24, the cover 12 with the inner cutting cylinder 10 will revolve inside the stationary cylinder 6 and draw with them the scoops 27 which by the pressure of the grain against them will be kept in the fixed position as shown in plan on Figs. 2 and 3, shoveling and thrusting the grains through the slots of the stationary cylinder 6 where they are met and cut by the revolving knives 11 of the inner cylinder 10. Reversing the direction of rotation, the pressure of the grains will be on the opposite side of the scoops, and they will automatically assume the position as shown on Fig. 2 in dash and dot, turning around their axes O.

Should one of the scoops assume at the start the exact middle position, at which the grain pressure upon either side of it is the same, that scoop may be pushed into the right position by hand, while in the running condition its own impulse in the process of reversing will overcome that dead point, similar to a single cylinder steam engine, if the crank at the starting happens to be on the dead centre, the flywheel is given a push, while in the running condition its own impulse carries the crank over the dead centres.

What I claim is:

1. A grain cutting machine, comprising a grain hopper with an offset flanged top supporting the rim of a hand wheel and having a tapered bottom with an open neck in centre, a stationary slotted cylinder fastened inside of said hopper and a rotating slotted cylinder with sharp cutting edges inside of said stationary cylinder, a cone shaped cover with its top fastened to the hub of said hand wheel and holding fast in its bottom the top of said rotating cylinder, scoops for thrusting the grains into the slots of said stationary cylinder, means for supporting said scoops and automatically adjusting them to the direction of rotation of said hand wheel, substantially as and for the purpose specified.

2. A grain cutting machine, comprising a grain hopper having an offset flanged top supporting the rim of a hand wheel and a tapered bottom with an open neck in centre and provided with cast on supporting brackets, a stationary slotted cylinder fastened inside of said hopper and a rotating slotted cylinder inside of said stationary cylinder, a cone shaped cover with its top fastened to the hub of said hand wheel and holding fast in its bottom the top of said rotating cylinder, scoops for thrusting the grains into the slots of said stationary cylinder, means for supporting said scoops and automatically adjusting them to the direction of rotation, substantially as and for the purpose set forth.

3. A grain cutting machine, comprising a grain hopper with an offset flanged top supporting the rim of a hand wheel and having a tapered bottom with an open neck in centre, and a stationary cylinder fastened to the open neck inside of said hopper and provided with longitudinal slots separated by triangular strips and with a slotted cylinder with sharp cutting edges reciprocating inside, a cone shaped cover with its top fastened to the hub of said hand wheel and holding fast in its bottom the top of said reciprocating cylinder, scoops for thrusting the grains into the slots of said stationary cylinder, means for supporting and automatically adjusting said scoops, substantially as and for the purpose described.

4. A grain cutting machine, comprising a grain hopper with an offset flanged top supporting the rim of a hand wheel and having a tapered bottom with an open neck in centre, a stationary slotted cylinder fastened inside of said hopper with a rotating slotted cylinder inside of said stationary cylinder, and a cone shaped cover having a hub on top with a key-seated gudgeon fastened to the hub of said hand wheel and holding fast in its bottom the top of said rotating slotted cylinder and provided with lugs near its base with screwed in pivots carrying a plate ring and separator rings, scoops for thrusting the grains into the slots of said stationary cylinder, substantially as and for the purpose specified.

5. A grain cutting machine, comprising a grain hopper with an offset flanged top supporting the rim of a hand wheel and having a tapered bottom with an open neck in centre, a stationary slotted cylinder fastened inside of said hopper with a rotating slotted cylinder inside of said stationary cylinder, a cone shaped cover with its top fastened to the hub of said hand wheel and holding fast in its bottom the top of said rotating cylinder and provided with lugs near its base with pivots carrying a plate ring and separator rings, and grain shoveling and thrusting scoops consisting of bent plates with flat tops held between said plate ring and the lugs of said cone shaped cover and freely swinging around the separator rings on said pivots, substantially as and for the purpose set forth.

In testimony whereof, I have hereunto signed my name, at Syracuse, in the county of Onondaga, and State of New York, this 22 day of January, 1923.

DAVID GUELBAUM.